(12) United States Patent
Cuddeford et al.

(10) Patent No.: US 12,549,547 B2
(45) Date of Patent: Feb. 10, 2026

(54) UNIVERSAL DEVICE IDENTIFIERS AND SIGNAL EXCHANGE COLLABORATION

(71) Applicant: JAMF SOFTWARE, LLC, Minneapolis, MN (US)

(72) Inventors: Dan Cuddeford, Mill Valley, CA (US); Matthew Vlasach, Larkspur, CA (US); Mateusz Popialo, Katowice (PL)

(73) Assignee: JAMF SOFTWARE, LLC, Minneapolis, MN (US)

( * ) Notice: Subject to any disclaimer, the term of this patent is extended or adjusted under 35 U.S.C. 154(b) by 52 days.

(21) Appl. No.: 18/441,676

(22) Filed: Feb. 14, 2024

(65) Prior Publication Data

US 2024/0275782 A1    Aug. 15, 2024

Related U.S. Application Data

(60) Provisional application No. 63/484,997, filed on Feb. 14, 2023.

(51) Int. Cl.
*G06F 7/04*     (2006.01)
*H04L 9/40*     (2022.01)

(52) U.S. Cl.
CPC ...... *H04L 63/0876* (2013.01); *H04L 63/0823* (2013.01)

(58) Field of Classification Search
CPC ......... G06F 21/64; H04L 9/08; H04L 9/0816; H04L 9/0866; H04L 9/3263; H04L 63/0876; H04L 63/0823
See application file for complete search history.

(56) References Cited

U.S. PATENT DOCUMENTS

| | | |
|---|---|---|
| 9,246,686 B1 | 1/2016 | Holland et al. |
| 2016/0037333 A1 | 2/2016 | Amundsen et al. |

(Continued)

FOREIGN PATENT DOCUMENTS

| | | |
|---|---|---|
| WO | 2020076234 A1 | 4/2020 |
| WO | 2022050833 A1 | 3/2022 |

OTHER PUBLICATIONS

Mazhar et al, Role of Device Identification and Manufacturer Usage Description in IoT Security: A Survey, Mar. 10, 2021, IEEE, pp. 41757-41786. (Year: 2021).*

(Continued)

*Primary Examiner* — Philip J Chea
*Assistant Examiner* — Jenise E Jackson
(74) *Attorney, Agent, or Firm* — Benesch Friedlander Coplan & Aronoff LLP

(57) ABSTRACT

In certain aspects of the disclosure, a computer-implemented method includes enrolling, at a mobile device management service, at least one managed device. The method includes receiving a client certificate on the at least one managed device. The method includes integrating, via a trusted ecosystem vendor app on the at least one managed device, a universal device identifier SDK. The method includes retrieving, by the universal device identifier SDK based on a request from the trusted ecosystem vendor app, a pre-salted device identifier address associated with the at least one managed device. The method includes transmitting, by the at least one managed device via the trusted ecosystem vendor, the pre-salted device identifier address to a security vendor service for generating a universal device identifier address. The method includes receiving, from the security vendor service by the at least one managed device via the trusted ecosystem vendor, the universal device identifier address.

19 Claims, 15 Drawing Sheets

(56) References Cited

U.S. PATENT DOCUMENTS

| | | | | |
|---|---|---|---|---|
| 2018/0034822 A1* | 2/2018 | Mistry | ................. | H04W 12/37 |
| 2019/0109820 A1* | 4/2019 | Clark | .................... | H04L 9/0861 |
| 2019/0121988 A1 | 4/2019 | van de Ruit et al. | | |
| 2020/0374129 A1* | 11/2020 | Dilles | ................... | H04L 9/3273 |
| 2021/0329058 A1 | 10/2021 | Adams et al. | | |
| 2022/0385467 A1 | 12/2022 | Ramadasse et al. | | |
| 2024/0171567 A1* | 5/2024 | Perlman | ................ | H04L 63/083 |

OTHER PUBLICATIONS

Gamba et al, An Analysis of Pre-installed Android Software, May 21, 2020, IEEE, pp. 1039-1055. (Year: 2020).*

Acar et al., Sok: Lessons Learned From Android Security Research for Appified Software Platforms, May 26, 2016, IEEE, pp. 433-451. (Year: 2016).*

International Searching Authority dated May 6, 2024 for PCT/US2024/015789, 2 pages.

International Search Report and Written Opinion issued in International Patent Application No. PCT/US24/15789, mailing date Jul. 18, 2024.

\* cited by examiner

UNIVERSAL DEVICE IDENTIFIERS AND SIGNAL EXCHANGE COLLABORATION

CROSS-REFERENCE TO RELATED APPLICATION

The present application claims the benefit of priority under 35 U.S.C. § 119 from U.S. Provisional Patent Application Ser. No. 63/484,997 entitled "Universal Device Identifiers and Signal Exchange," filed on Feb. 14, 2023, the disclosure of which is hereby incorporated by reference in its entirety for all purposes.

TECHNICAL FIELD

The present disclosure generally relates to device identifiers, and more specifically relates to generating universal open device identifiers.

BACKGROUND

It can be difficult for trusted ecosystem vendors or participants (e.g., security vendors and application providers) to establish a common identifier that they can all obtain and agree on for a given physical device asset. This is largely because open source (OS) vendors are increasingly limiting the ability for applications to obtain a common device identifier for privacy and anti-tracking purposes. However, in the case of enterprise security, it is reasonable and required for multiple security tools to establish an opaque identifier that all trusted ecosystem vendors or participants can use to identify a given physical asset.

Further, there is a need for a scalable and flexible data relay exchange mechanism about a given physical asset between zero trust ecosystem providers, which can include, but is not limited to, endpoint security vendors/providers, application developers/providers, network security vendors/providers, and other device-oriented members. There is currently no clear or winning standard to do this generically.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method is provided. The method includes enrolling, at a mobile device management service, at least one managed device. The method includes receiving a client certificate on the at least one managed device. The method includes integrating, via a trusted ecosystem vendor app on the at least one managed device, a universal device identifier SDK. The method includes retrieving, by a universal device identifier endpoint SDK based on a request from the trusted ecosystem vendor app, a pre-salted device identifier address associated with the at least one managed device. The method includes transmitting, by the at least one managed device via the trusted ecosystem vendor, the pre-salted device identifier address to a security vendor service for generating a universal device identifier address. The method includes receiving, from the security vendor service by the at least one managed device via the trusted ecosystem vendor, the universal device identifier address.

According to certain aspects of the present disclosure, a system is provided. The system includes one or more memories comprising instructions and one or more processors configured to execute the instructions which, when executed, cause the one or more processors to enroll, at a mobile device management service, at least one managed device. one or more processors is configured to execute the instructions which, when executed, cause the one or more processors to receive a client certificate on the at least one managed device. The one or more processors is configured to execute the instructions which, when executed, cause the one or more processors to integrate, via a trusted ecosystem vendor app on the at least one managed device, a universal device identifier SDK. The one or more processors is configured to execute the instructions which, when executed, cause the one or more processors to retrieve, by a universal device identifier endpoint SDK based on a request from the trusted ecosystem vendor app, a pre-salted device identifier address associated with the at least one managed device. The one or more processors is configured to execute the instructions which, when executed, cause the one or more processors to transmit, by the at least one managed device via the trusted ecosystem vendor, the pre-salted device identifier address to a security vendor service for generating a universal device identifier address. The one or more processors is configured to execute the instructions which, when executed, cause the one or more processors to receive, from the security vendor service by the at least one managed device via the trusted ecosystem vendor, the universal device identifier address.

According to certain aspects of the present disclosure, a computer-implemented method is provided. The method includes associating a universal device identifier address with a vendor device ID associated with at least one managed device. The method includes modifying metadata, based on changes of a risk posture associated with the at least one managed device, in a database. The method includes publishing, with a universal device identifier private key associated with the universal device identifier address, an entry to the distributed ledger of the changes of the risk posture.

According to certain aspects of the present disclosure, a system is provided. The system includes one or more memories comprising instructions and one or more processors configured to execute the instructions which, when executed, cause the one or more processors to associate a universal device identifier address with a vendor device ID associated with at least one managed device. The one or more processors is configured to execute the instructions which, when executed, cause the one or more processors to modifying metadata, based on changes of a risk posture associated with the at least one managed device, in a database. The one or more processors is configured to execute the instructions which, when executed, cause the one or more processors to publish, with a universal device identifier private key associated with the universal device identifier address, an entry to the distributed ledger of the changes of the risk posture.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Cryptographic and secure hardware-backed keystores are supported by numerous cipher suites that vary greatly. A common standard between trusted ecosystem vendors, hardware, and OSes will greatly improve future signal exchange collaboration. For example, extending these standards will further increase the portability of use. These standards can, for example, be extended into other open standards (e.g. public-key cryptography, blockchain, etc.).

In certain aspects of the disclosed technology, a universal device identifier is created that can utilize, but is not limited to utilizing, device management (e.g., mobile device management) to deploy and seed, thereby eliminating the traditional need of any specific device management vendor and adhering to well defined standards. In certain aspects, a universal device identifier (address) is created that is compatible with a distributed ledger system (e.g., blockchain), such that a public or private blockchain may be used for threat exchange in a truly decentralized manner. In certain aspects, the disclosed technology utilizes a system-level Public Key as the Private Key input for a further set of key generation, thus, adding compatibility across trusted ecosystem vendors and key types. The disclosed technology is advantageous over existing technology in that a chain of trust can be derived back to the original system-level key pair to attest authenticity. In certain aspects, the disclosed technology leverages blockchain technologies to exchange signals and meta data between members (e.g., trusted ecosystem vendors or participants) using these universal device identifiers as device subject identifiers.

Figure 1:
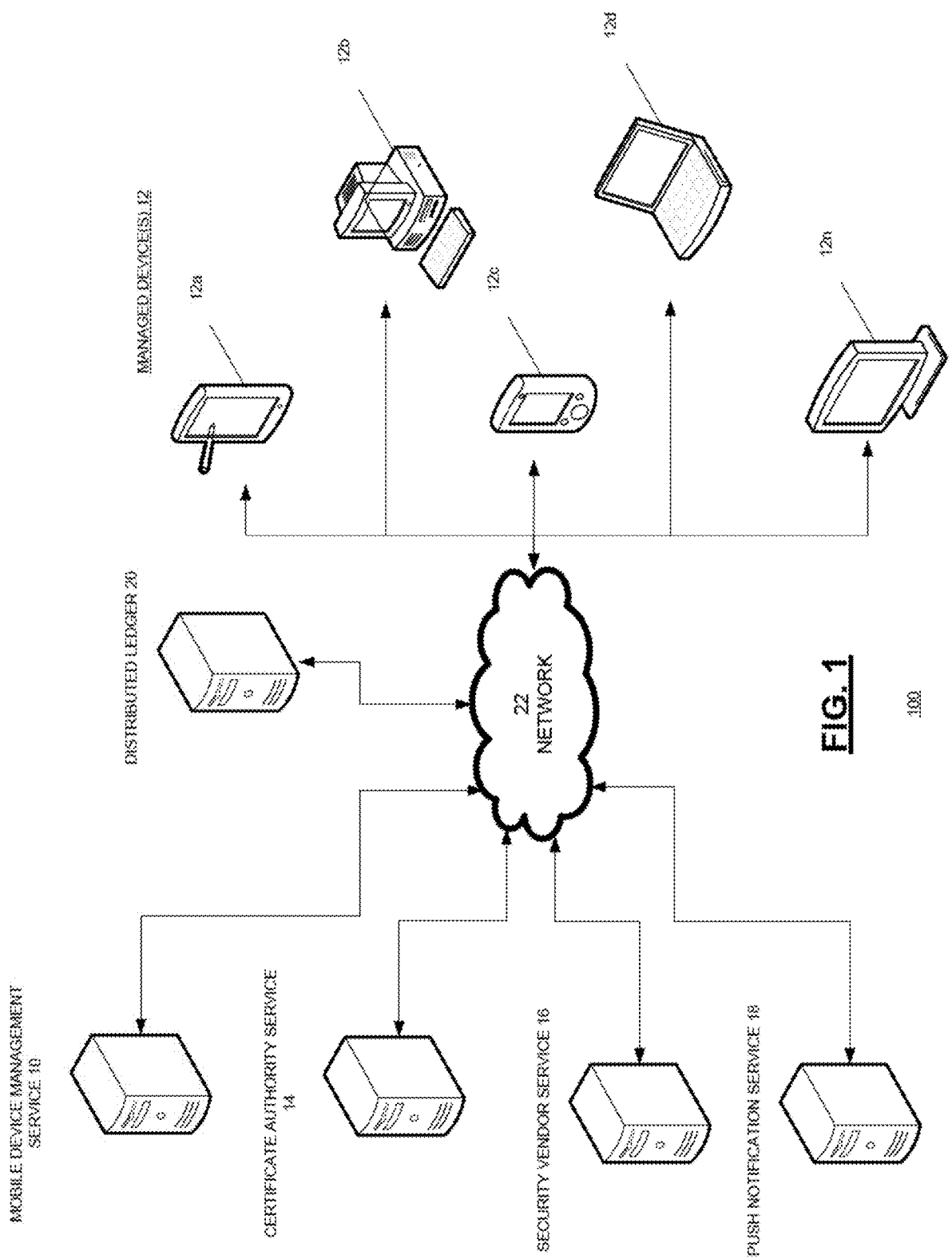
FIG. 1 illustrates an example architecture for generating universal device identifiers.

FIG. 1 illustrates an example architecture 100 for generating universal device identifiers. For example, the architecture 100 includes a mobile device management service 10, at least one managed device 12, such as a first managed device 12a and a second managed device 12b to an nth managed device 12n, a certificate authority service 14, a security vendor service 16, a push notification service 18, and, in some aspects, a distributed ledger 20, all connected over a network 22. In certain aspects, the mobile device management service 10 may be connected to the push notification service 18 over a separate network.

The mobile device management service 10 can be any device having an appropriate processor, memory, and communications capability for communicating with at least one managed device 12, the certificate authority service 14, the security vendor service 16, the push notification service 18, and, in certain aspects, the distributed ledger 20. For purposes of load balancing, the mobile device management service 10 may include multiple servers. The certificate authority service 14 can be any device having an appropriate processor, memory, and communications capability for communicating with the mobile device management service 10, the certificate authority service 14, the security vendor service 16, the at least one managed device 12, and, in certain aspects, the distributed ledger 20. The security vendor service 16 can be any device having an appropriate processor, memory, and communications capability for communicating with the mobile device management service 10, the certificate authority service 14, the security vendor service 16, the at least one managed device 12, and, in certain aspects, the distributed ledger 20.

The push notification service 18 can be any device having an appropriate processor, memory, and communications capability for communicating with the mobile device management service 10 and the at least one managed device 12. In certain aspects, the distributed ledger 20 can be any device having an appropriate processor, memory, and communications capability for communicating with the mobile device management service 10, the at least one managed device 12, the certificate authority service 14, and the security vendor service 16. The at least one managed device 12, such as the first managed device 12a and the second managed device 12b, to which the mobile device management service 10 communicates with over the network 22 via the push notification service 18, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management service 10, the certificate authority service 14, and the security vendor service 16, and the push notification service 18 can be a cloud computing server of an infrastructure-as-a-service (IaaS) and be able to support a platform-as-a-service (PaaS) and software-as-a-service (SaaS) services.

It should be noted that the present disclosure is not limited to any particular configuration or number of devices. In certain aspects, a different number of devices may be present.

The network 22 can include, for example, any one or more of a personal area network (PAN), a local area network (LAN), a campus area network (CAN), a metropolitan area network (MAN), a wide area network (WAN), a broadband network (BBN), the Internet, and the like. Further, the network 22 can include, but is not limited to, any one or more of the following network topologies, including a bus network, a star network, a ring network, a mesh network, a star-bus network, tree or hierarchical network, and the like.

Figure 2:
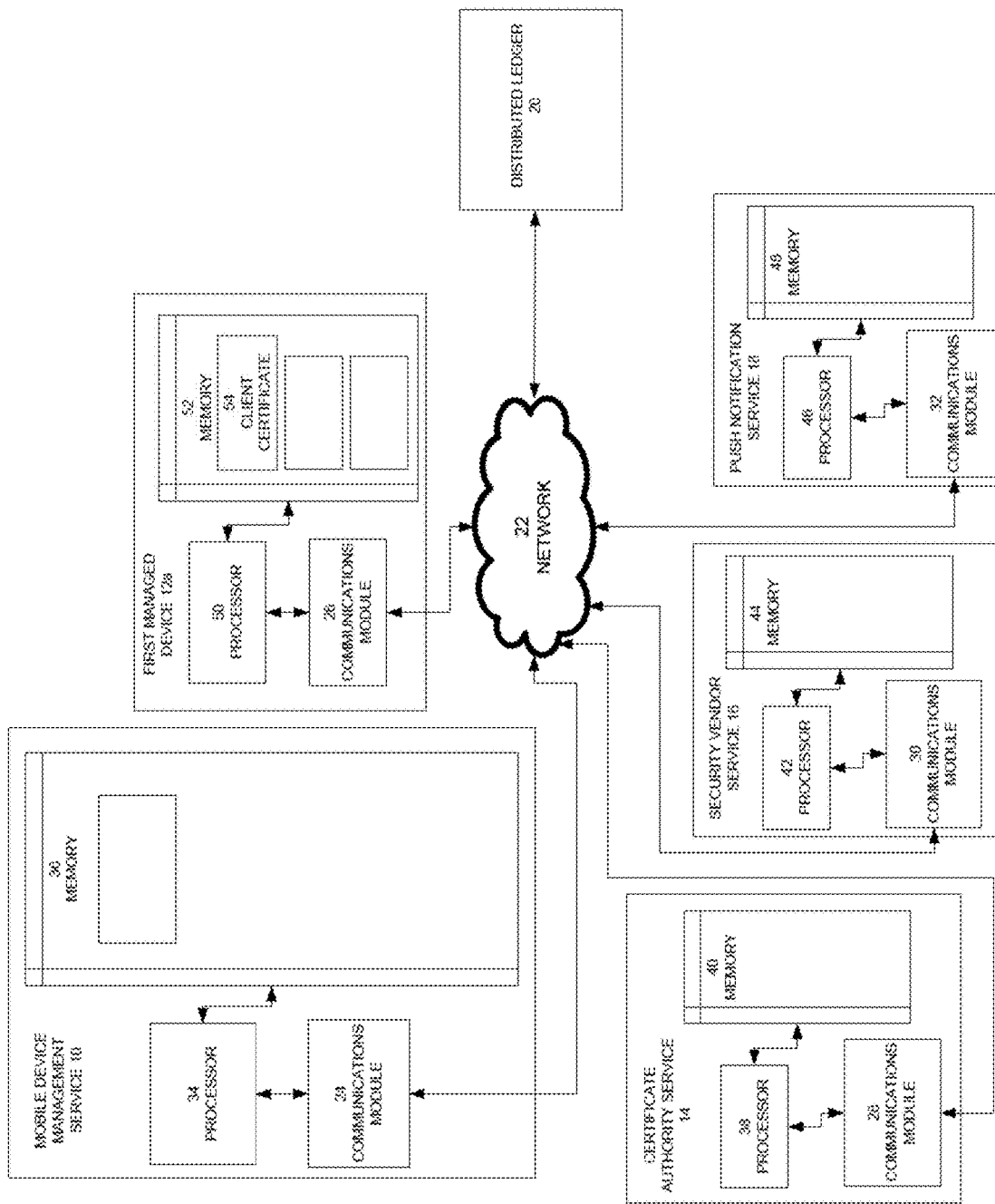
FIG. 2 is a block diagram illustrating the example mobile device management service, at least one managed device, certificate authority service, security vendor service, push notification service, and distributed ledger from the architecture of FIG. 1 according to certain aspects of the disclosure.

FIG. 2 is a block diagram illustrating examples of the mobile device management service 10, the at least one managed device 12, such as a first managed device 12a, the certificate authority service 14, the security vendor service 16, the push notification service 18, and in certain aspects, the distributed ledger 20 in the architecture of FIG. 1 according to certain aspects of the disclosure. It should be understood that for purposes of explanation the first managed device 12a is described, but any number of the at least one managed device 12 could be used.

The mobile device management service 10, the at least one managed device 12, such as a first managed device 12a, the certificate authority service 14, the security vendor service 16, and the push notification service 18 are connected over the network 22 via respective communication modules 24, 26, 28, 30, 32. The communication modules 24, 26, 28, 30, 32 are configured to interface with the network 22 to send and receive information, such as data, requests, responses, and commands to other devices on the network 22. The communications modules 24, 26, 28, 30, 32 can be, for example, modems or Ethernet cards.

The mobile device management service 10 includes a processor 34, the communications module 24, and a memory 36. The processor 34 of the mobile device management service 10 is configured to execute instructions, such as instructions physically coded into the processor 34, instructions received from software in the memory 36, or a combination of both. The processor 34 of the mobile device management service 10 is configured to perform any of its functions described herein.

The certificate authority service 14 includes a processor 38, the communications module 28, and a memory 40. The processor 38 of the certificate authority service 14 is configured to execute instructions, such as instructions physically coded into the processor 38, instructions received from software in the memory 40, or a combination of both. The processor 38 of the certificate authority service 14 is configured to perform any of its functions described herein.

The security vendor service 16 includes a processor 42, the communications module 30, and a memory 44. The processor 42 of the security vendor service 16 is configured to execute instructions, such as instructions physically coded into the processor 42, instructions received from software in the memory 44, or a combination of both. The processor 42 of the security vendor service 16 is configured to perform any of its functions described herein.

The push notification service 18 includes a processor 46, the communications module 32, and a memory 48. The processor 42 of the push notification service 18 is configured to execute instructions, such as instructions physically coded into the processor 46, instructions received from software in the memory 48, or a combination of both. The processor 42 of the push notification service 18 is configured to perform any of its functions described herein.

The at least one managed device 12, such as a first managed device 12a, includes a processor 50, the communications module 26, and a memory 52. The processor 42 of the at least one managed device 12 is configured to execute instructions, such as instructions physically coded into the processor 50, instructions received from software in the memory 52, or a combination of both. The processor 42 of the at least one managed device 12 is configured to perform any of its functions described herein.

The distributed ledger 20 can be, but is not limited to, a blockchain or other appropriate distributed ledger.

Figure 3:
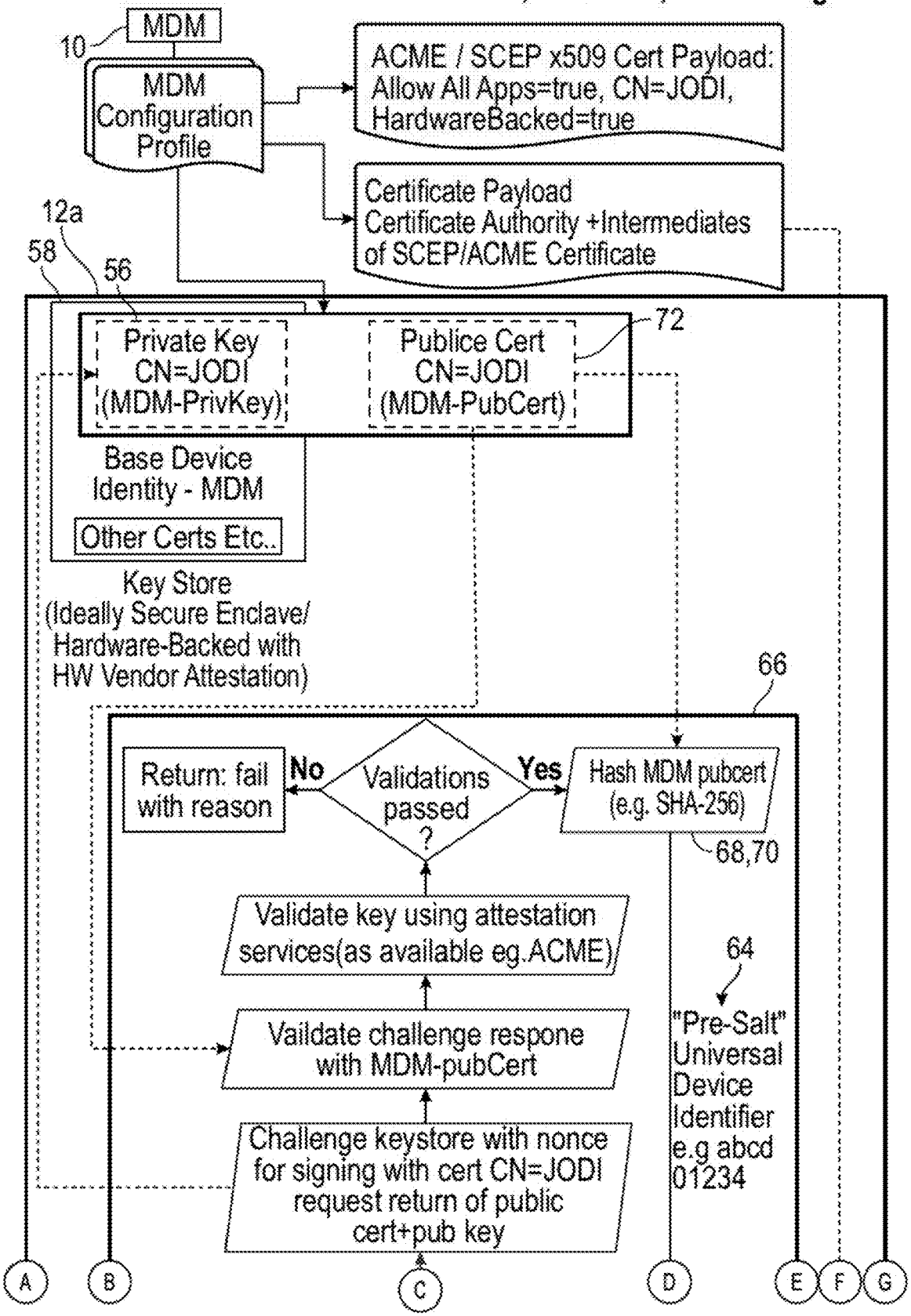
FIG. 3 a diagram illustrating an exemplarily flow chart for generating universal device identifiers, according to certain aspects of the disclosure.
Figure 3:
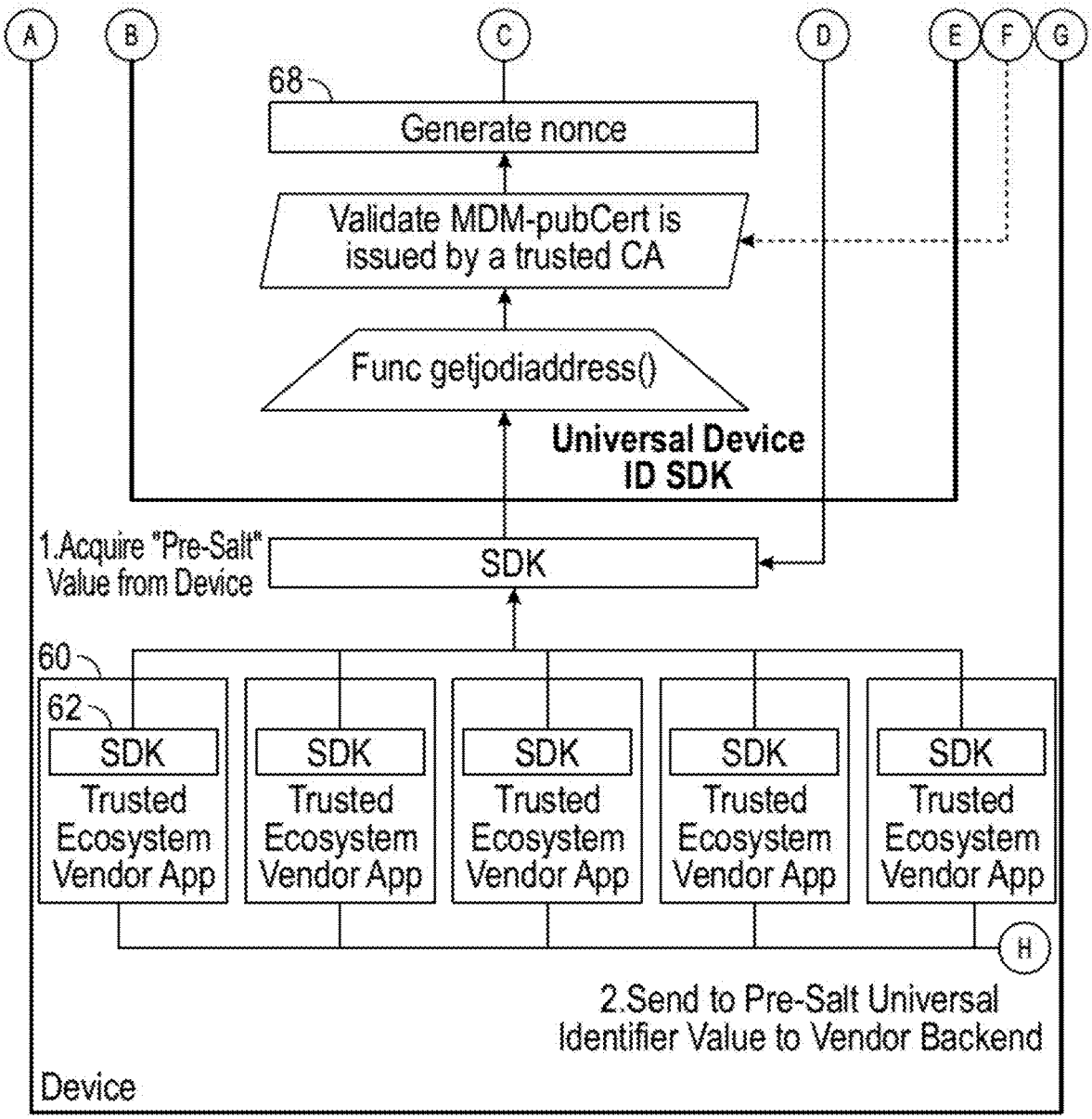
Figure 3:
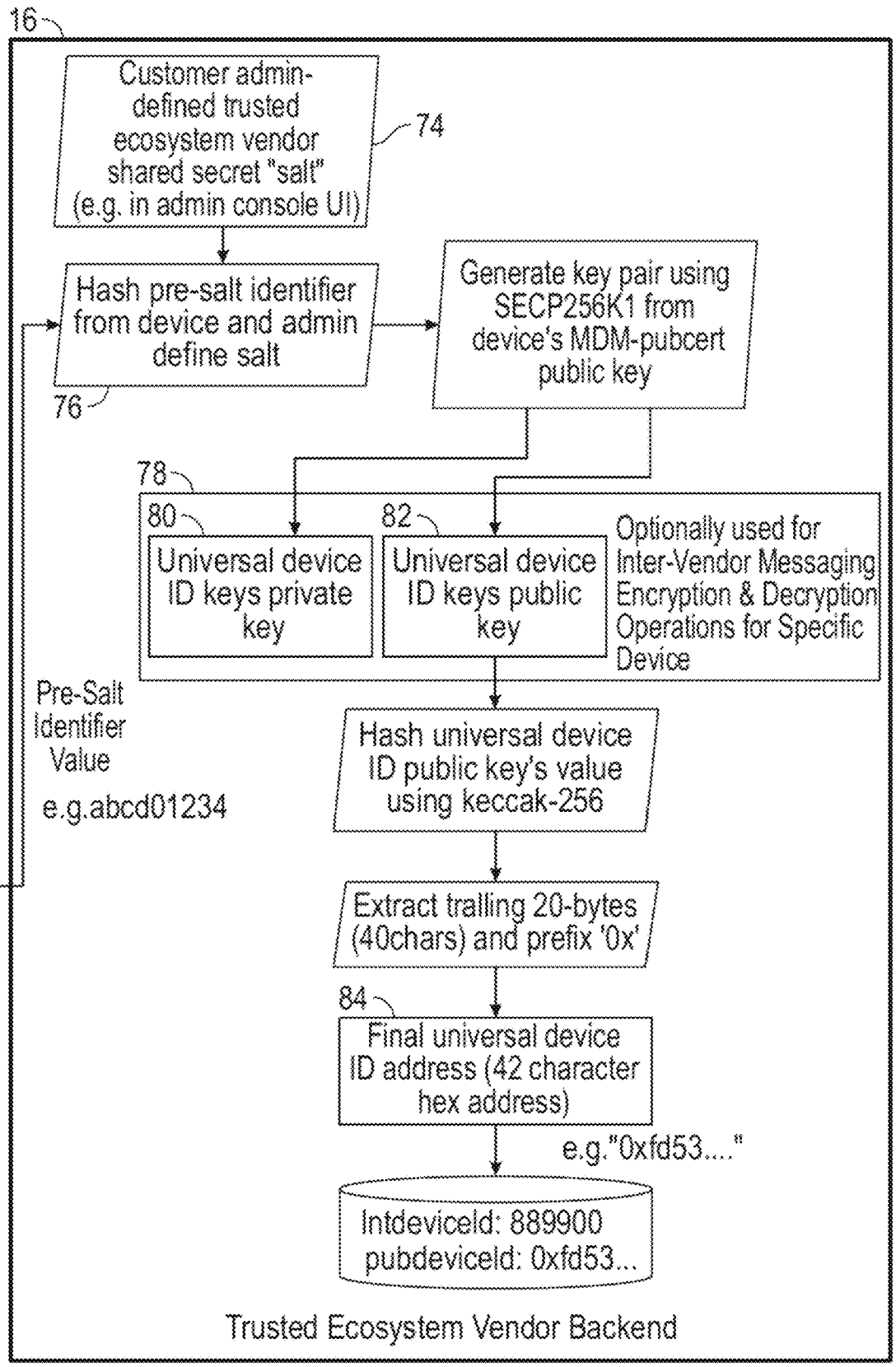

With reference to FIGS. 2 and 3, the disclosed technology provides methods, systems, and non-transitory machine-readable storage medium for generating universal device identifiers. An exemplarily method for generating universal device identifiers (e.g., shared identifier) can include the following steps:
  a. An at least one managed device 12 (e.g. macOS, Windows, iOS/iPadOS, Android) may be enrolled into a device management system, such as the mobile device management service 10 (e.g. Jamf Pro, Microsoft Intune, mobile device management system, etc.)
  b. A certificate-based identity (e.g., client certificate 54) is issued by the certificate authority service 14 and installed on the at least one managed device 12:
    a. Using any certificate authority (public or private), such as the certificate authority service 14
    b. Generating the private key 56 for the certificate 54 on-device (e.g. SCEP, ACME) of the at least one managed device 12
    c. Generating the private key 56 on-device of the at least one managed device 12 in a non-exportable/extractable manner
    d. In certain aspects, using a hardware-backed keystore 58 to generate the private key 56 on the at least one managed device 12 for added security
    e. In certain aspects, using device attestation services
  c. All participating trusted ecosystem vendor endpoint agent software (e.g., trusted ecosystem vendor app 60) running on the target device (e.g., the at least one managed device 12) integrates a new universal device identifier SDK 62 as described in the present disclosure.
  d. The participating trusted ecosystem vendor software (e.g., trusted ecosystem vendor app 60) calls a single function in the universal device identifier SDK 62 requesting the device's (e.g., the at least one managed device 12) pre-salted device identifier address 64. This function works as follows in the universal device identifier endpoint SDK 66 when called:
      a. The MDM-installed (e.g., mobile device management service 10) client certificate's (e.g., client certificate 54) trust chain is validated to have been issued from an enterprise-trusted certificate authority (e.g., certificate authority service 14).
      b. The universal device identifier endpoint SDK 66 generates a nonce 68 to challenge the hardware-backed keystore 58 using APIs
      c. The universal device identifier endpoint SDK 66 sends the nonce 68 to the keystore 58, referencing the installed client certificate 54 by subject (or other) attributes (e.g. CN=universal device identifier, OID 1.2.3.4.x, etc.)
      d. Using the private key 56 in the keystore 58, the keystore 58 returns the signed nonce challenge response 68 along with the corresponding public certificate/key 70.
      e. The universal device identifier endpoint SDK 66 validates the nonce response 68 using the returned public key 72
      f. The universal device identifier endpoint SDK 66 attests the integrity of the private key 56 using platform-specific attestation services/capabilities, as available.
      g. The universal device identifier endpoint SDK 66 returns the pre-salted device identifier (e.g., pre-salted device identifier address 64) to the calling app.
  e. The pre-salted device identifier (e.g., pre-salted device identifier address 64) is transmitted by the trusted ecosystem vendor app 60 to their cloud backend (e.g., security vendor service 16) via existing vendor-specific mechanisms and means.
  f. The security vendor service 16 generates a value 76 by hashing the pre-salted device identifier (e.g., pre-salted device identifier address 64) with a secret (string or administrator defined salt 74) that was entered by the customer administrator in the trusted ecosystem vendor's backend/console, which is in communication with the security vendor service 16.
      a. All trusted ecosystem vendors will require the definition of this shared secret (string or administrator defined salt 74) to prove that the vendor is authorized to generate the identifier (e.g., the private key 56) in the customer's environment (e.g., the at least one managed device 12).
  g. In certain aspects, the resulting value 76 can be subject to any of the following further processing:
      a. A new keypair is generated using the SECP256K1 key generation algorithm, using the generated hash from the previous step. This new keypair is known as the universal device identifier keypair 78, which includes a universal device identifier private key 80 and a universal device identifier public key 82.
      b. The universal device identifier private key 80 is associated and may be stored with the logical device entry and is used for payload decryption when receiving messages with this device (e.g., the at least one managed device 12) as the message's subject.
      c. The universal device identifier public key 82 is associated and stored with this device (e.g., the at least one managed device 12) for message encryption for signaling with other ecosystem vendors. The value of the universal device identifier public key 82 is also hashed using an algorithm to generate a byte string.
          i. The disclosed technology, in certain aspects, is capable of using, for example, the keccak-256 hashing algorithm for Ethereum blockchain compatibility.
      d. Optionally, the resulting string is truncated to the last 20 bytes (40 characters), with a '0x' appended to the front of the string.
          i. This step is optional, but is required for some distributed ledgers, such as, for example, Ethereum blockchain addressing compatibility.
      e. This results in a final universal device identifier address 84, which is 42 characters in length and represented as a hex address.
      f. The universal device identifier address 84 is associated with the logical device (e.g., the at least one managed device 12) in the ecosystem vendor's database as the final correlating device identifier.
  h. The participating trusted ecosystem vendor app 60 now has the universal device identifier address 84 that it can use as the universal device identifier for subsequent inter-vendor (e.g., trusted ecosystem vendors) communications and logging use cases including:
      a. Sending event logs to one or more SIEM/SOAR/Datalake/BI tools, referencing the device (e.g., the at least one managed device 12) by its universal device identifier address 84 as the device's primary correlating identifier.
      b. Publishing events to other trusted ecosystem vendors using other proprietary or open standards (e.g. OpenID SSF/CAEP) with the universal device identifier address 84 as the device ID/subject/correlating identifier.
      c. Encoding into cross-domain packet flows and exchanges
      d. Submitting events as ledger entries to a distributed ledger 20 (e.g., a blockchain) with the "To" recipient being the universal device identifier address 84 value.
      e. Any such events can be dequeued from the trusted ecosystem vendor's endpoint agent software (e.g., trusted ecosystem vendor app 60), backend cloud/on-prem service, or both, depending upon out-of-scope use case requirements.
  i. Other participating trusted ecosystem vendors can repeat the exact same steps above with their endpoint applications and backends. All participating trusted ecosystem vendors are signaling each other and ecosystem tools using a common, universally unique, and cryptographically improbable to impersonate correlating identifier (e.g., the universal device identifier).
  j. The universal device identifier vendor consumers may also embed the universal device identifier SDK 66 into their app to obtain the universal device identifier address 84 of the device (e.g., the at least one managed device 12) the application binary is running upon using the above process.
      a. This app (e.g., the universal device identifier SDK 66) or its backend (e.g., the security vendor service 16) can then reference/subscribe to specific trusted ecosystem security vendor events using the universal device identifier address 84 to derive the trust state of the device (from vendor-specific APIs or ideally via the distributed blockchain).

Figure 4:
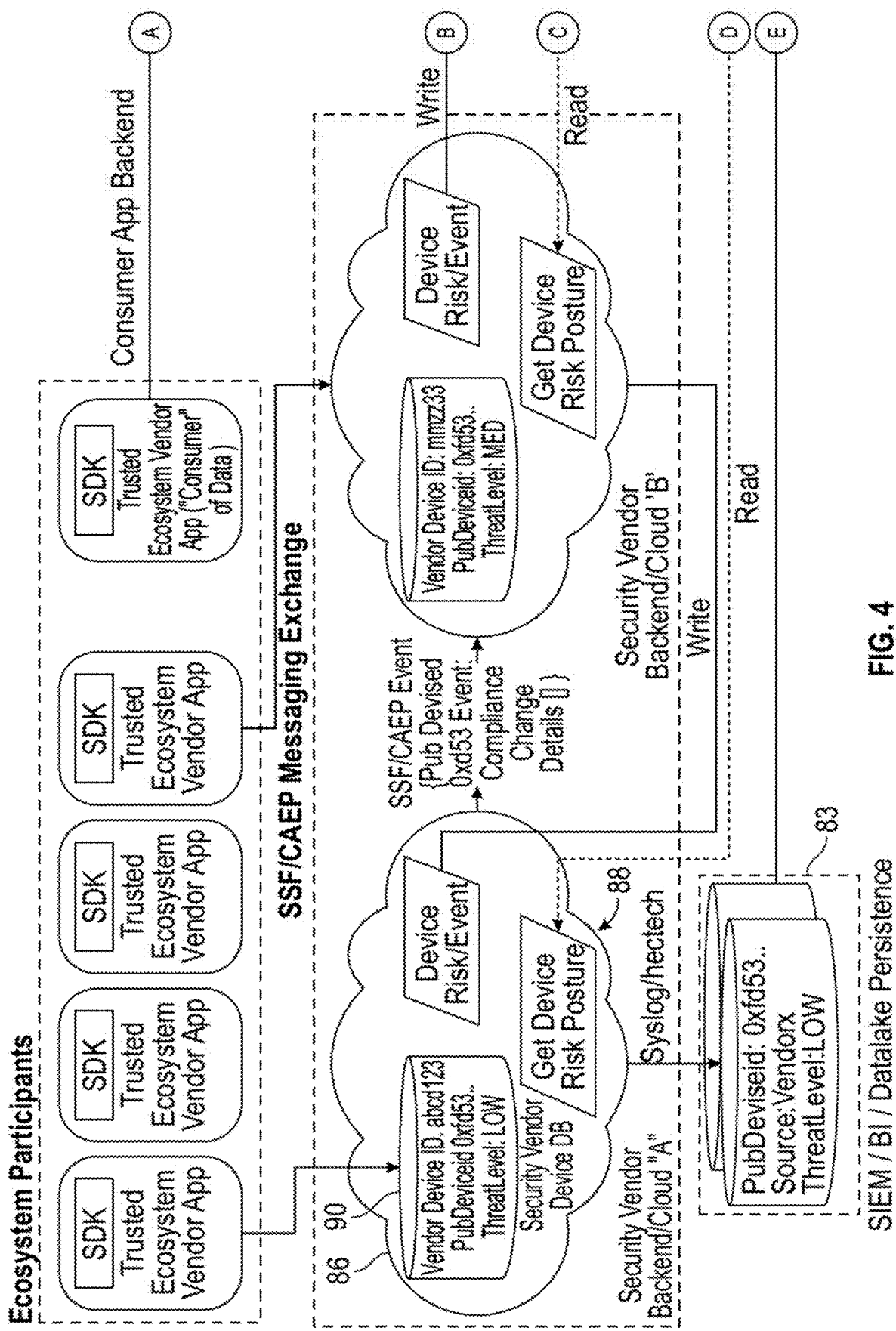
FIG. 4 is a diagram illustrating an exemplarily flow chart for exchanging device metadata, via a blockchain, with a universal device identifier address associated with the universal device identifiers generated in FIG. 3, according to certain aspects of the disclosure.
Figure 4:
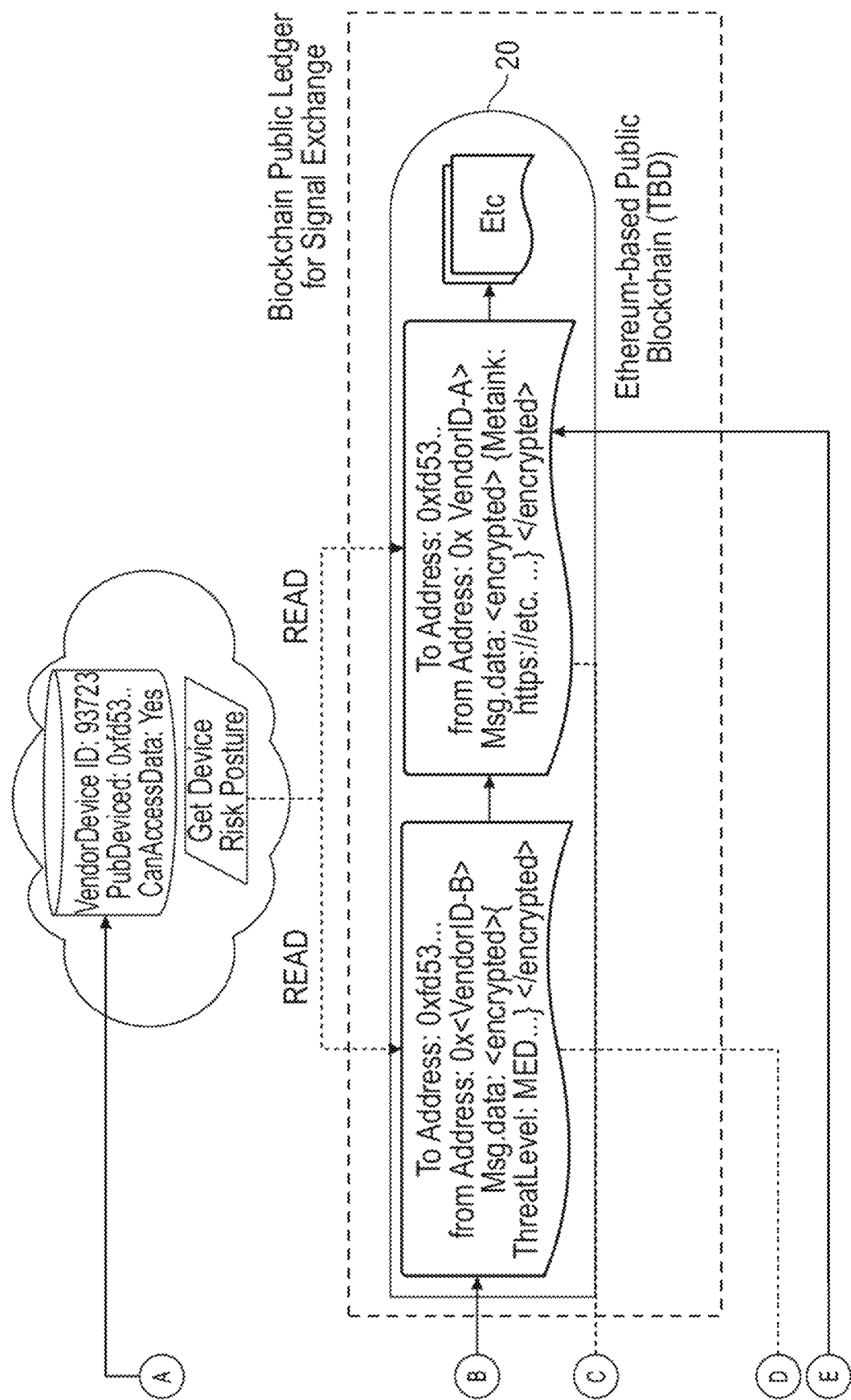

Additionally, with reference to FIGS. 2-4, the disclosed technology provides methods, systems, and non-transitory machine-readable storage medium for exchanging device metadata of a device, via a distributed ledger, such as, for example, a blockchain, with a universal device identifier address associated with a universal device identifier of the device. An exemplarily method for exchanging device metadata of a device, via a distributed ledger, such as, for example, a blockchain, with a universal device identifier address associated with a universal device identifier of the device can include the following steps:

- a. Following the above, with reference to FIG. 3, participating trusted ecosystem vendors (e.g., the security vendor service 16) associate the universal device identifier address 84 obtained from the universal device identifier endpoint SDK 66 with their own representation of a given device identifier (e.g., vendor device ID 86) associated with a device (e.g., the at least one managed device 12).
- b. As that device's risk posture 88 or context changes, metadata pertaining to the device (e.g., the at least one managed device 12) is modified in the participating trusted ecosystem vendors database 90/records.
- c. With each relevant change, a new entry is published into a public blockchain ledger (e.g. the distributed ledger 20) using the trusted ecosystem security vendor's institution private key (e.g., universal device identifier private key 80) that is used for blockchain ledger entries. No value needs to be sent, only the mining/gas fee along with the aforementioned metadata.
  - a. Published metadata should be encrypted using the private key (e.g., universal device identifier private key 80) derived during the SECP256K1 keypair generation process or otherwise obfuscated (e.g. using zero-knowledge proofs) to protect the privacy of the data being published to the block chain (e.g., the distributed ledger 20).
- d. The entry is confirmed by the blockchain (e.g., the distributed ledger 20) miners, with the updated representation of the device (e.g., the distributed ledger 20) available for anyone to read.
- e. Invalid "noise" may be published to the blockchain in the form of additional leger entries to limit data introspection that may be otherwise possible on a public blockchain.
- f. Subscribers to the blockchain—e.g. other participating trusted ecosystem vendors—observe the new entry.
- g. The "From" address of the entry is matched against an "allowed" list of participating trusted ecosystem vendors that is trusted by the Subscriber that is consuming the entry
  - a. If the "from" address is not in this list, such an entry may a) be from an untrusted security vendor, b) represent a malicious entry that should be ignored, or c) represent a malicious entry that should be evaluated as an indicator of attack
- h. Subscribers are therefore able to evaluate all blockchain entries with a given "To" universal device identifier address to ingest that device's cradle-to-grave threat exposure and trusted ecosystem security vendor rated risk posture over time.
  - a. This eliminates any one vendor/entity from being a designated interpreter of threat intelligence on the blockchain (e.g., the distributed ledger 20).
- i. Subscribers are able to ingest the contents of the blockchain entry and decrypt its contents using the private key generated as part of the SECP256K1 process for the observed universal device identifier address.
- j. Subscribers are then able to utilize the received signal to apply database updates, enforce policy, or perform virtually any other function expected of the product with the new information.

Figure 5:
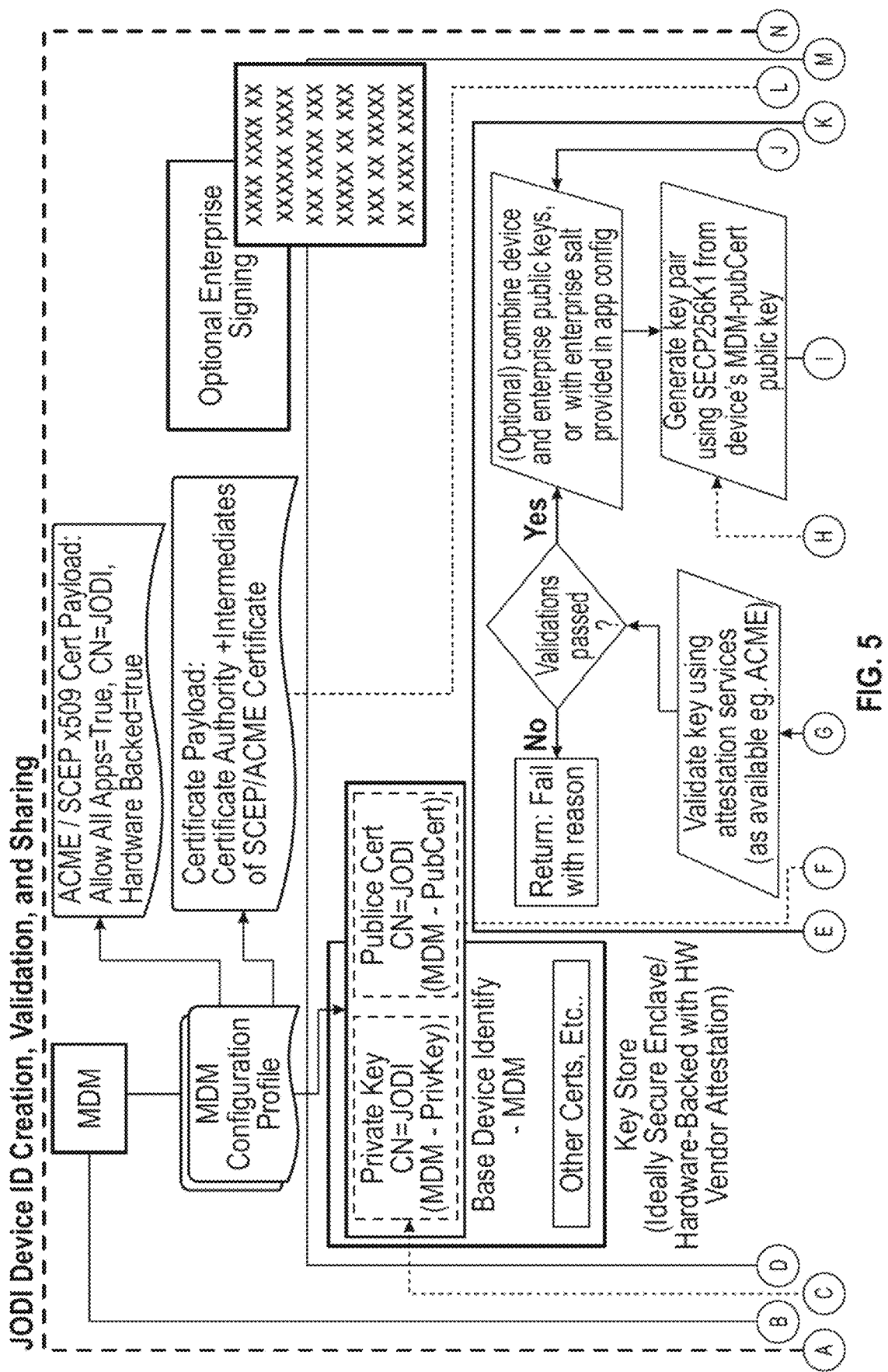
FIG. 5 is a block diagram illustrating an alternative exemplarily flow chart for generating universal device identifiers, according to certain aspects of the disclosure.
Figure 5:
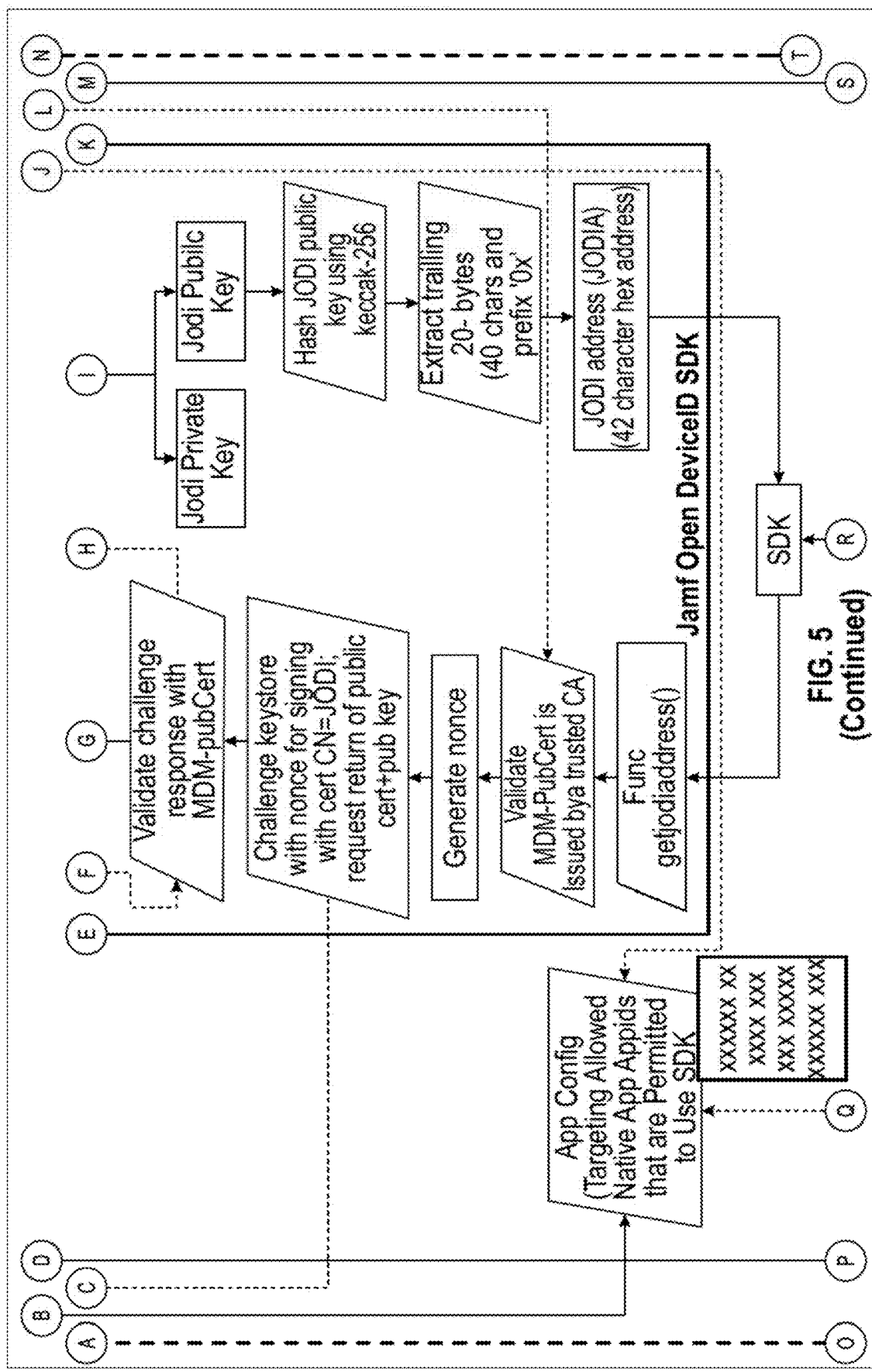
Figure 5:
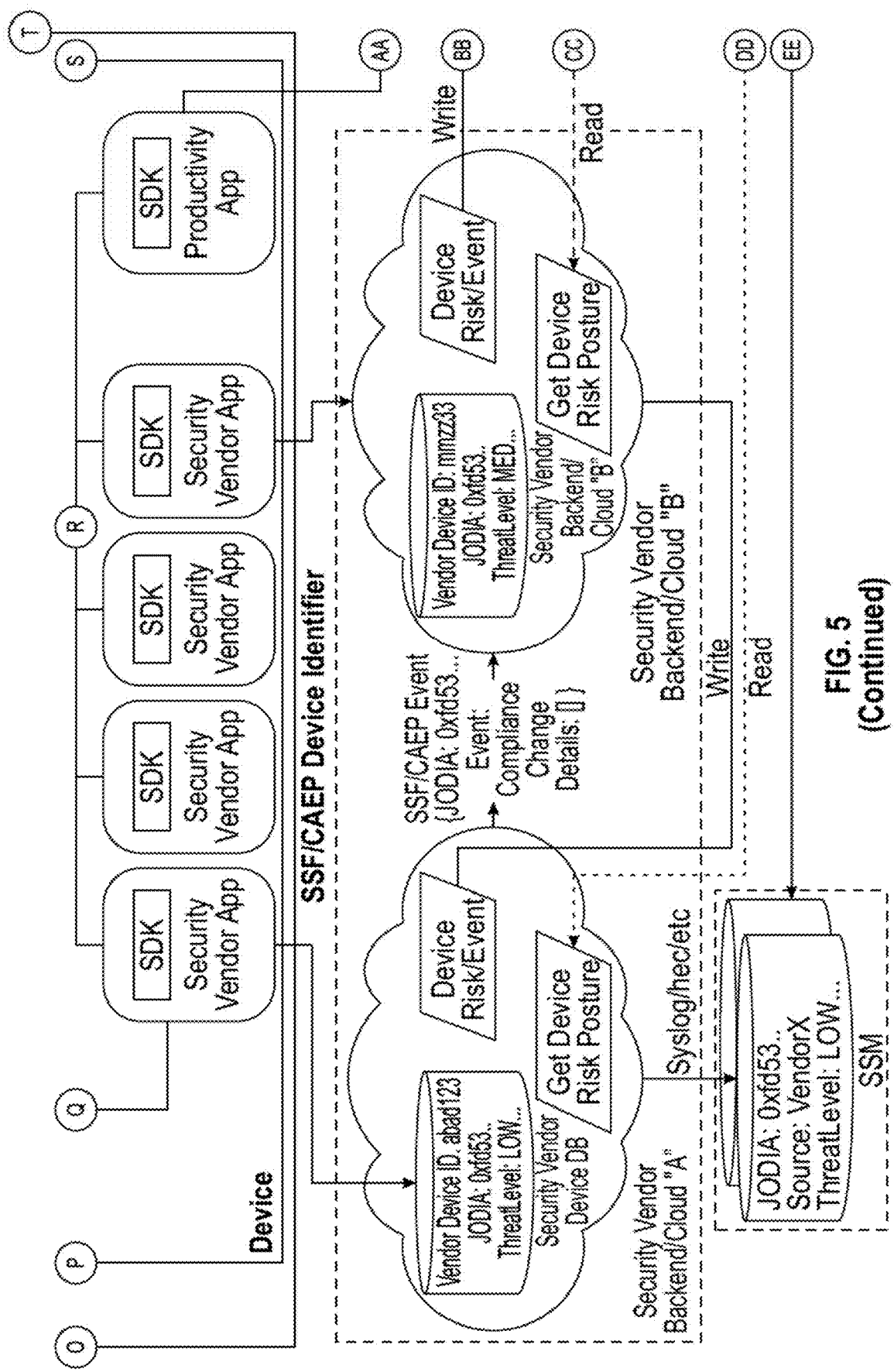
Figure 5:
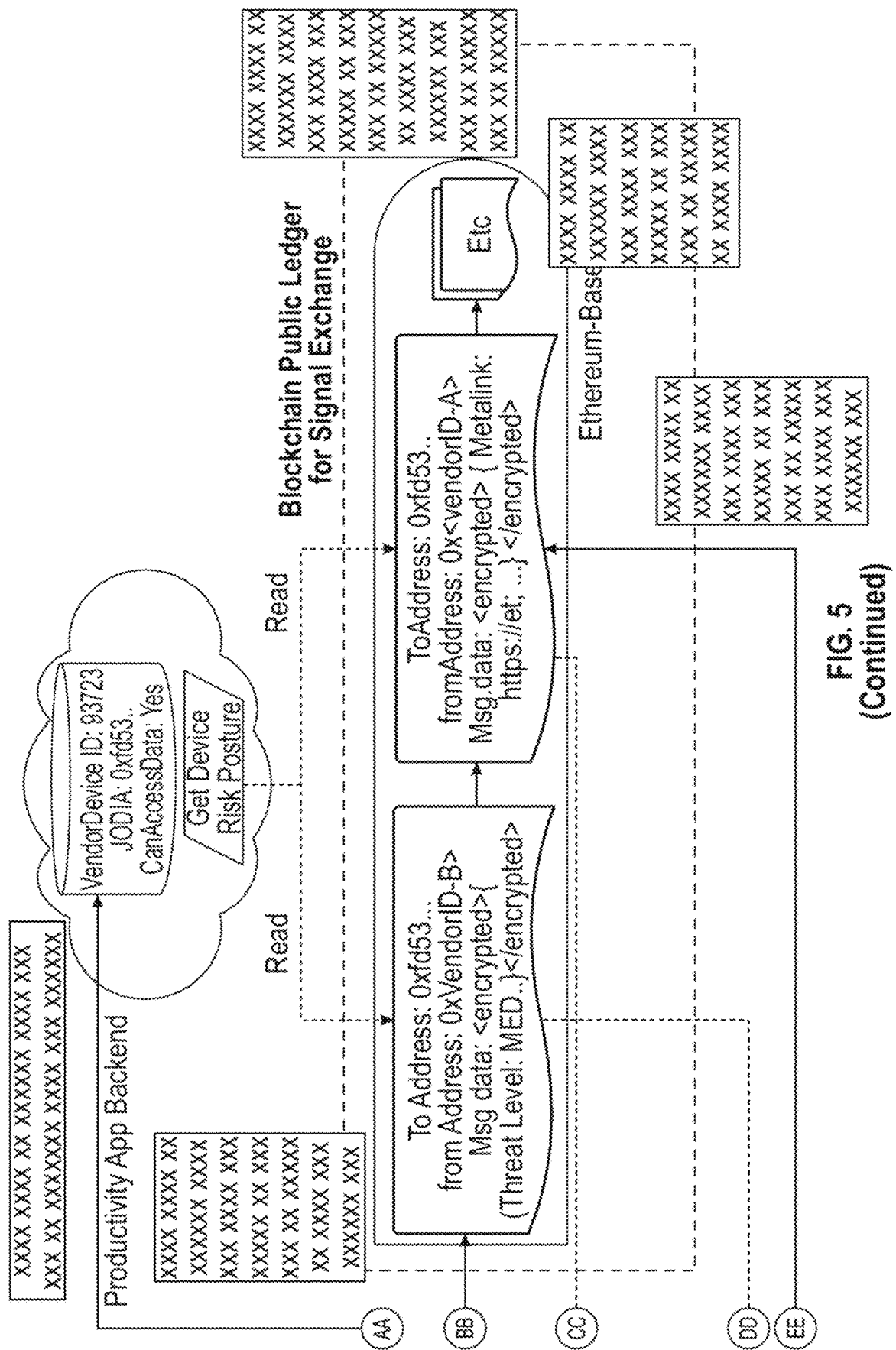

FIG. 5 is a block diagram illustrating an alternative exemplarily flow chart for generating universal device identifiers.

Figure 6:
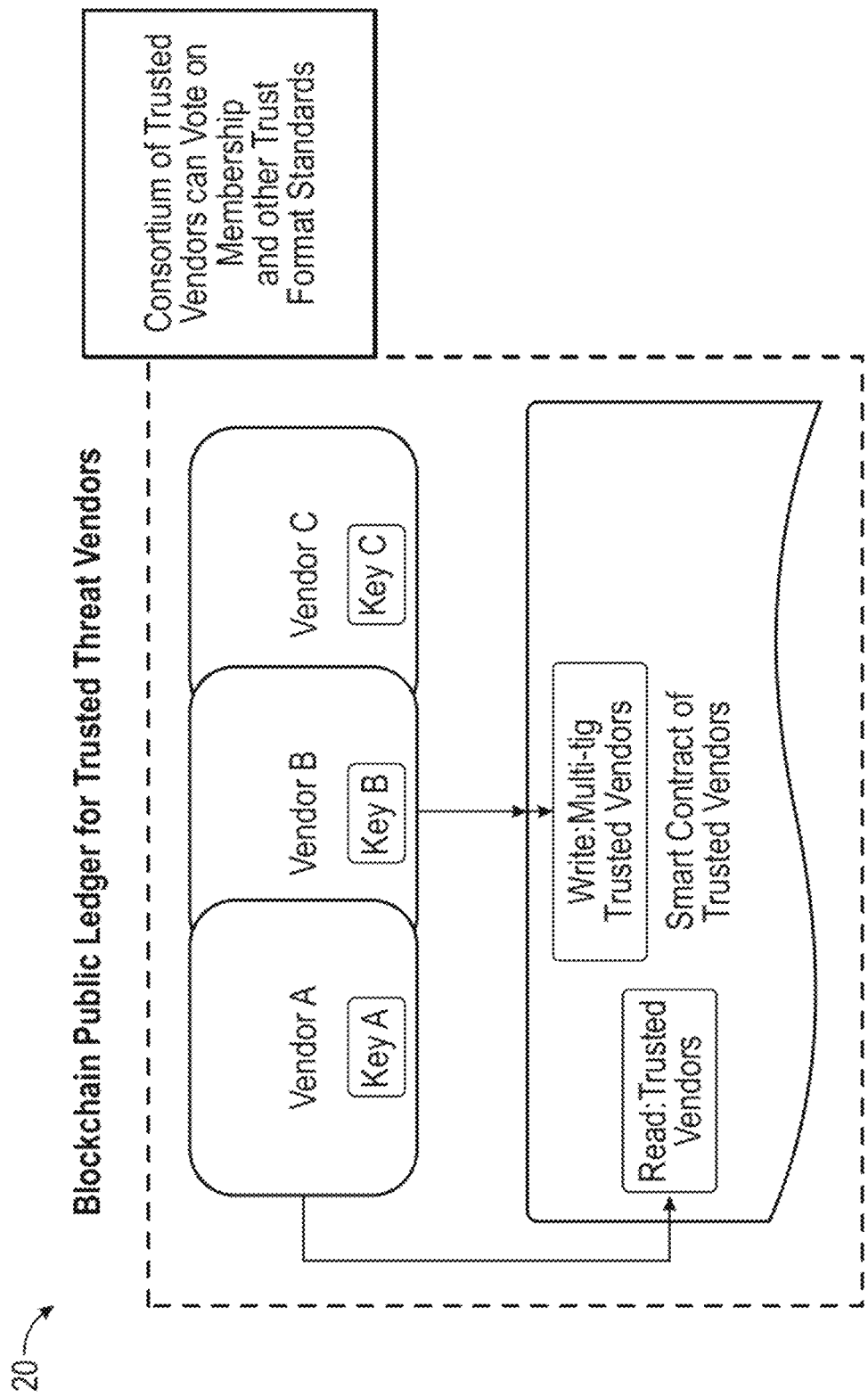
FIG. 6 is a block diagram illustrating a distributed ledger, such as a blockchain public ledger, for trusted ecosystem vendors or participants in association with the flow chart of FIG. 5, according to certain aspects of the disclosure.

FIG. 6 is a block diagram illustrating a distributed ledger, such as a blockchain public ledger, for trusted ecosystem vendors or participants in association with the flow chart of FIG. 5.

Figure 7:
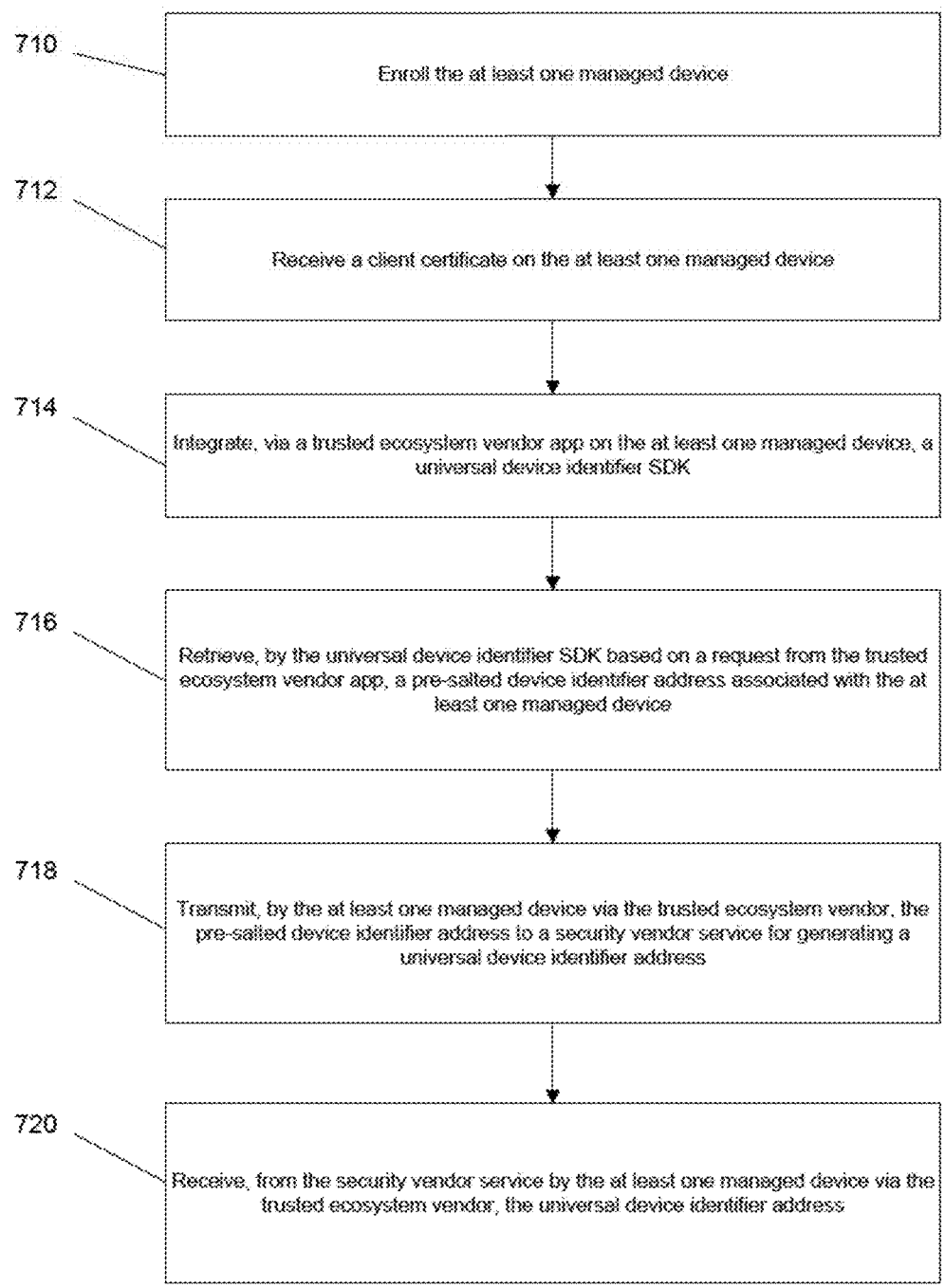
FIG. 7 is an example process for generating universal device identifiers using the example mobile device management service, at least one managed device, certificate authority service, security vendor service, and push notification service of FIG. 2.

FIG. 7 illustrates an example process 700 using the mobile device management service 10, the at least one managed device 12, such as a first managed device 12a, the certificate authority service 14, the security vendor service 16, the push notification service 18, and in certain aspects, the distributed ledger 20. While FIG. 7 is described with reference to FIGS. 2 and 3, it should be understood that the process steps of FIG. 7 may be performed by other systems.

The process 700 begins by proceeding to step 710 when the processor 34 of the mobile device management service 10 enrolls the at least one managed device 12. As depicted at step 712, the processor 50 of the at least one managed device 12 receives the client certificate 54. As depicted at step 714, the processor 50 of the at least one managed device 12, via the ecosystem vendor app 60, integrates the universal device identifier SDK 62. The universal device identifier endpoint SDK retrieves, based on a request from the trusted ecosystem vendor app 60, the pre-salted device identifier address 64 associated with the at least one managed device 12, as shown at step 716. The processor 50 of the at least one managed device 12, via the ecosystem vendor app 60, transmits the pre-salted device identifier address 64 to the security vendor service 16 for generating the universal device identifier address 84, as shown at step 718. As depicted at step 720, the processor 50 of the at least one managed device 12 receives, from the security vendor service 16, via the security vendor service 16, the universal device identifier address 84.

Figure 8:
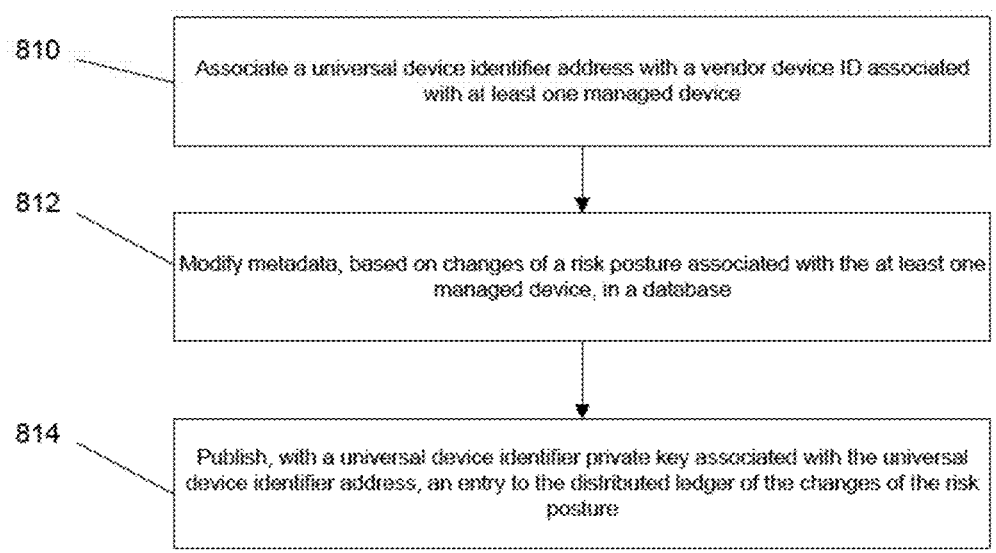
FIG. 8 is an example process for generating universal device identifiers using the example mobile device management service, at least one managed device, certificate authority service, security vendor service, push notification service, and distributed ledger of FIG. 2.

FIG. 8 illustrates an example process 800 using the mobile device management service 10, the at least one managed device 12, such as a first managed device 12a, the certificate authority service 14, the security vendor service 16, the push notification service 18, and in certain aspects, the distributed ledger 20. While FIG. 8 is described with reference to FIGS. 2-4, it should be understood that the process steps of FIG. 8 may be performed by other systems.

The process 800 begins by proceeding to step 810 when the processor 42 of the security vendor service 16 associates the universal device identifier address 84 is associated with a vendor device ID 86 associated with at least one managed device 12. As depicted at step 812, the processor 42 of the security vendor service 16 modifies metadata, based on changes of a risk posture 88 associated with the at least one managed device 12, in the database 90. The processor 42 of the security vendor service 16 publishes, with the universal device identifier private key 80 associated with the universal device identifier address 84, an entry to the distributed ledger of the changes of the risk posture 88.

Figure 9:
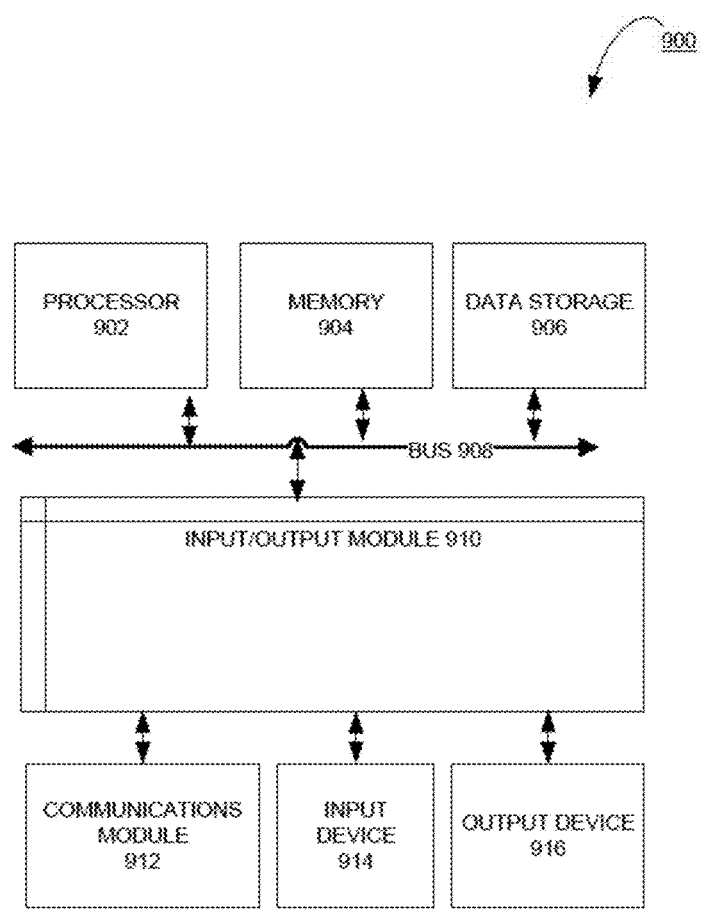
FIG. 9 is block diagram illustrating an example computer system with which the mobile device management service, the at least one managed device, the certificate authority service, the security vendor service, and the push notification service of FIG. 2 can be implemented.

FIG. 9 is a block diagram illustrating an example computer system 900 with which the mobile device management service 10, the at least one managed device 12, such as a first managed device 12a, the certificate authority service 14, the security vendor service 16, and the push notification service 18 of FIG. 2 can be implemented. In certain aspects, the computer system 900 may be implemented using hardware or a combination of software and hardware, either in a dedicated server, or integrated into another entity, or distributed across multiple entities.

Computer system 900 (e.g., the mobile device management service 10, the at least one managed device 12, such as a first managed device 12a, the certificate authority service 14, the security vendor service 16, and the push notification service 18) includes a bus 908 or other communication mechanism for communicating information, and a processor 902 (e.g., the processor 34, 38, 42, 46, 50) coupled with bus 908 for processing information. According to one aspect, the computer system 900 can be a cloud computing server of an IaaS that is able to support PaaS and SaaS services.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., the memory 36, 40, 44, 48, 52), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer readable medium for execution by, or to control the operation of, the computer system 900.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Example input/output modules 910 include data ports such as USB ports. In addition, input/output module 910 may be provided in communication with processor 902, so as to enable near area communication of computer system 900 with other devices. The input/output module 910 may provide, for example, for wired communication in some implementations, or for wireless communication in other implementations, and multiple interfaces may also be used. The input/output module 910 is configured to connect to a communications module 912. Example communications modules 912 (e.g., the communications module 24, 26, 28, 30, 32) include networking interface cards, such as Ethernet cards and modems.

In certain aspects, the input/output module 910 is configured to connect to a plurality of devices, such as an input device 914 and/or an output device 916. Example input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device.

According to one aspect of the present disclosure the mobile device management service 10, the at least one managed device 12, such as a first managed device 12a, the certificate authority service 14, the security vendor service 16, and the push notification service 18 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. Processor 902 may process the executable instructions and/or data structures by remotely accessing the computer program product, for example by downloading the executable instructions and/or data structures from a remote server through communications module 912 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 902 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 908. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for generating universal device identifiers, the method comprising:
   enrolling, at a mobile device management service, at least one managed device;
   receiving a client certificate on the at least one managed device;
   integrating, via a trusted ecosystem vendor app on the at least one managed device, a universal device identifier SDK (software development kit);
   retrieving, by a universal device identifier endpoint SDK based on a request from the trusted ecosystem vendor app, a pre-salted device identifier address associated with the at least one managed device;
   transmitting, by the at least one managed device via the trusted ecosystem vendor, the pre-salted device identifier address to a security vendor service for generating a universal device identifier address; and
   receiving, from the security vendor service by the at least one managed device via the trusted ecosystem vendor, the universal device identifier address.

2. The computer-implemented method of claim 1, wherein receiving the client certificate comprises:
   generating a private key for the client certificate on the at least one managed device.

3. The computer-implemented method of claim 2, wherein the private key is non-exportable.

4. The computer-implemented method claim 2, wherein the private key is generated via a hardware-backed keystore.

5. The computer-implemented method of claim 4, wherein retrieving the pre-salted device identifier address comprises:
   validating a trust chain of the client certificate;
   generating a nonce to challenge the hardware-backed keystore;
   transmitting the nonce to the hardware-backed keystore referencing the client certificate;
   receiving, based on the private key, a signed nonce challenge response and corresponding public key;
   validating the nonce challenge response using the corresponding public key that was returned;
   attesting integrity of the private key; and
   returning the pre-salted device identifier.

6. The computer-implemented method of claim 2, wherein generating the universal device identifier address comprises:
   generating a value by hashing the pre-salted device identifier with an administrator defined salt.

7. The computer-implemented method of claim 6, wherein generating the value comprises:
   generating, via a SECP256K1 key generation algorithm, a universal device identifier keypair.

8. The computer-implemented method of claim 1, wherein the universal device identifier address comprises 42 characters in length and is represented as a hex address.

9. The computer-implemented method of claim 1, wherein the universal device identifier address is associated with the at least one managed device in a database associated with the security vendor service as a final correlating device identifier.

10. A system comprising:
    one or more memories comprising instructions; and
    one or more processors configured to execute the instructions, which, when executed, cause the one or more processors to:
      enroll, at a mobile device management service, at least one managed device;
      receive a client certificate on the at least one managed device;
      integrate, via a trusted ecosystem vendor app on the at least one managed device, a universal device identifier SDK;
      retrieve, by a universal device identifier endpoint SDK based on a request from the trusted ecosystem vendor app, a pre-salted device identifier address associated with the at least one managed device;
      transmit, by the at least one managed device via the trusted ecosystem vendor, the pre-salted device identifier address to a security vendor service for generating a universal device identifier address; and
      receive, from the security vendor service by the at least one managed device via the trusted ecosystem vendor, the universal device identifier address.

11. The system of claim 10, wherein the instructions to receive the client certificate further comprise instructions to cause the one or more processors to:
    generate a private key for the client certificate on the at least one managed device.

12. The system of claim 11, wherein the private key is non-exportable.

13. The system of claim 11, wherein the private key is generated via a hardware-backed keystore.

14. The system of claim 13, wherein the instructions to retrieve the pre-salted device identifier address comprise instructions to cause the one or more processors to:
    validating a trust chain of the client certificate;
    generating a nonce to challenge the hardware-backed keystore;
    transmitting the nonce to the hardware-backed keystore referencing the client certificate;
    receiving, based on the private key, a signed nonce challenge response and corresponding public key;
    validating the nonce challenge response using the corresponding public key that was returned;
    attesting integrity of the private key; and
    returning the pre-salted device identifier.

15. The system of claim 11, wherein the instructions to generate the universal device identifier address comprise further instructions to cause the one or more processors to:

generate a value by hashing the pre-salted device identifier with an administrator defined salt.

16. The system of claim 15, wherein the instructions to generate the value comprise further instructions to cause the one or more processors to:
generate a value by hashing the pre-salted device identifier with an administrator defined salt.

17. The system of claim 10, wherein the universal device identifier address comprises 42 characters in length and is represented as a hex address.

18. The system of claim 10, wherein the universal device identifier address is associated with the at least one managed device in a database associated with the security vendor service as a final correlating device identifier.

19. A non-transitory machine-readable storage medium comprising machine-readable instructions for causing one or more processors to execute a method, the method comprising:

enrolling, at a mobile device management service, at least one managed device;

receiving a client certificate on the at least one managed device;

integrating, via a trusted ecosystem vendor app on the at least one managed device, a universal device identifier SDK;

retrieving, by a universal device identifier endpoint SDK based on a request from the trusted ecosystem vendor app, a pre-salted device identifier address associated with the at least one managed device;

transmitting, by the at least one managed device via the trusted ecosystem vendor, the pre-salted device identifier address to a security vendor service for generating a universal device identifier address; and receiving, from the security vendor service by the at least one managed device via the trusted ecosystem vendor, the universal device identifier address.

* * * * *